(No Model.)
A. SMITH.
SAW.
No. 488,844. Patented Dec. 27, 1892.
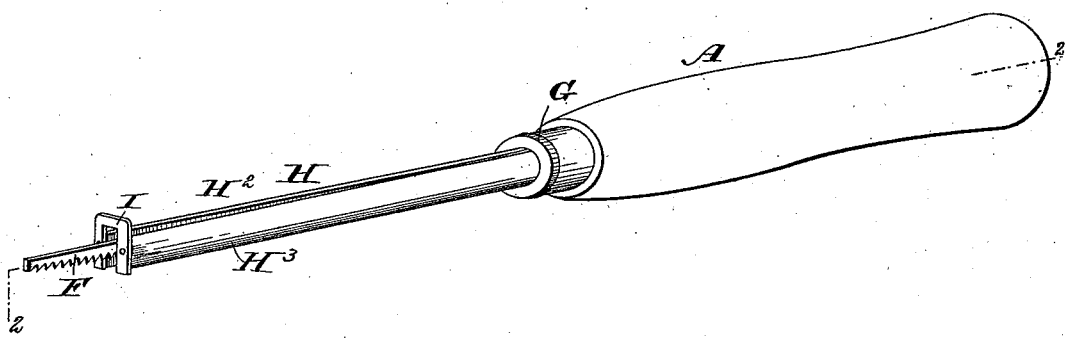
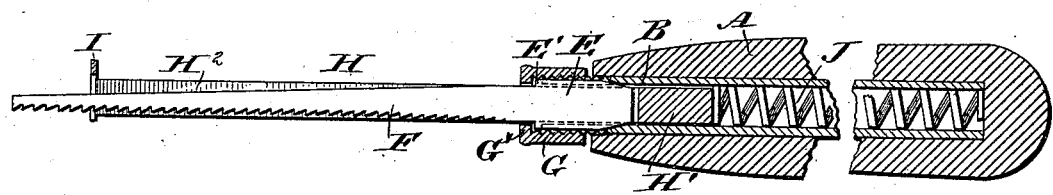
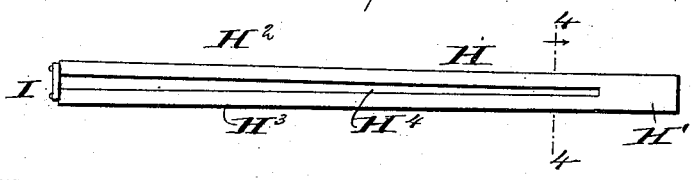
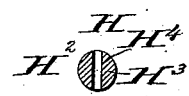
WITNESSES:
H. Walker
E. M. Clark
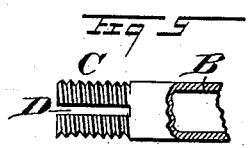
INVENTOR:
Albert Smith
BY Munn & Co.
ATTORNEYS

UNITED STATES PATENT OFFICE.

ALBERT SMITH, OF NEW YORK, N. Y.

SAW.

SPECIFICATION forming part of Letters Patent No. 488,844, dated December 27, 1892.

Application filed November 10, 1891. Renewed November 30, 1892. Serial No. 453,581. (No model.)

*To all whom it may concern:*

Be it known that I, ALBERT SMITH, of the city, county, and State of New York, have invented a new and Improved Saw, of which the following is a full, clear, and exact description.

The object of the invention is to provide a new and improved saw, which is simple and durable in construction and more especially designed for cutting key-holes in doors and for other similar purposes.

The invention consists of a spring pressed guard fitted to slide alongside the saw blade.

The invention also consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1 is a perspective view of the improvement; Fig. 2 is a sectional side elevation of the same; Fig. 3 is a plan view of the guard; Fig. 4 is a cross section of the same on the line 4—4 of Fig. 3; and Fig. 5 is a plan view, with parts in section, of the ferrule holding the saw blade and forming a bearing for the guard.

The improved saw is provided with a suitable handle A in which is secured a tube or pipe B projecting at the end of the handle, to form the screw threaded portion C having a vertical slot D adapted to be engaged by the head E of the saw blade F. The head E forms, with the saw blade, a shoulder E' adapted to be engaged by a flange G' formed on the nut G screwing on the threaded portion C of the tube or pipe B. The nut G thus screwed on the threaded portion C with the head E of the saw blade F in the slot D, securely holds and fastens the saw blade F to the tube B and consequently to the handle A. A guard H engages the sides of the saw blade F and is preferably made of a single piece of metal having its end H' fitted to slide in the tube B in the rear of the head E of the saw blade F. From the end H' of the guard H extend forward the arms $H^2$ and $H^3$ forming a slot $H^4$ for the passage of the saw blade F. The outer ends of the arms $H^2$ and $H^3$ are rigidly connected with each other by a cap I preferably made U-shaped, the legs being secured to the ends of the arms $H^2$ and $H^3$ as illustrated in the drawings.

The end of the saw blade F extends a short distance beyond the cap I, but the remainder of the blade is guided between the arms $H^2$ and $H^3$ of the guard. The rear end of the head E of the saw blade extends close to the inner end of the slot $H^4$ in the end H' when the guard is in an outermost position, as is plainly shown in Fig. 2.

On the inner end of the end H' of the guard H presses one end of a spring J coiled in the tube B, as is plainly shown in Fig. 1, the said spring permitting the guard H to slide rearward to compress the spring, and when the pressure is released on the guard the spring J again forces the latter into an outermost position.

The saw is used as follows:—When a hole has been drilled in the door, the operator inserts the projecting end of the saw blade in the aperture with the cap I resting against the face of the door. The operator then presses on the handle A so that the saw F is moved forward and cuts into the material. This forward pressing of the handle causes a rearward or inward sliding of the guard H, which is taken hold of by the operator to guide the cut of the saw. As soon as the operator releases the pressure, the handle A with the saw blade F. is forced rearward by the action of the spring J pressing on the outer end of the said handle as the guard H is held against the face of the door. It will be seen that the operator by taking hold of the guard, can conveniently guide the saw so as to cut the aperture in the proper shape.

Having thus described my invention I claim as new, and desire to secure by Letters Patent:—

1. A saw provided with a spring pressed guard fitted to slide on the saw blade, substantially as shown and described.

2. A saw provided with a spring pressed guard adapted to slide on the saw blade and having a longitudinal slot for the passage of the saw blade, substantially as shown and described.

3. A saw provided with a guard adapted to slide on the saw blade and formed with a head on which presses a spring, and two arms forming a slot for the passage of the saw blade, substantially as shown and described.

4. A saw provided with a guard adapted to slide on the saw blade and formed with a head on which presses a spring, two arms forming a slot for the passage of the saw blade, and a cap made U-shaped and connecting the outer ends of the arms of the guard, substantially as shown and described.

5. In a saw, the combination with a handle, of a tube held in the said handle and formed at its projecting end with a screw thread and a slot, a saw blade having a head engaging in the screw threaded portion of the tube, and a nut screwing on the said threaded portion of the tube to fasten the head of the saw blade to the said tube, substantially as shown and described.

6. In a saw, the combination with a handle, of a tube held in the said handle and formed at its projecting end with a screw thread and a slot, a saw blade having a head engaging the slot in the screw threaded portion of the tube, and a nut screwing on the said threaded portion of the tube to fasten the head of the saw blade to the said tube, the said nut being provided with an annular flange engaging a shoulder on the said head, substantially as shown and described.

7. In a saw, the combination with a handle, a tube held in the said handle and a saw blade fastened to the said tube, of a guard fitted to slide in the said tube and provided with a slot for the passage of the said saw blade, and a spring held in the said tube and pressing against the inner end of the said guard, substantially as shown and described.

ALBERT SMITH.

Witnesses:
ELLIS L. SPACKMAN,
HENRY L. B. WILLS.